April 19, 1932.  J. A. YOUNG  1,855,083
CONTROL FOR DIRIGIBLE HEADLIGHTS
Filed May 27, 1931    2 Sheets-Sheet 1
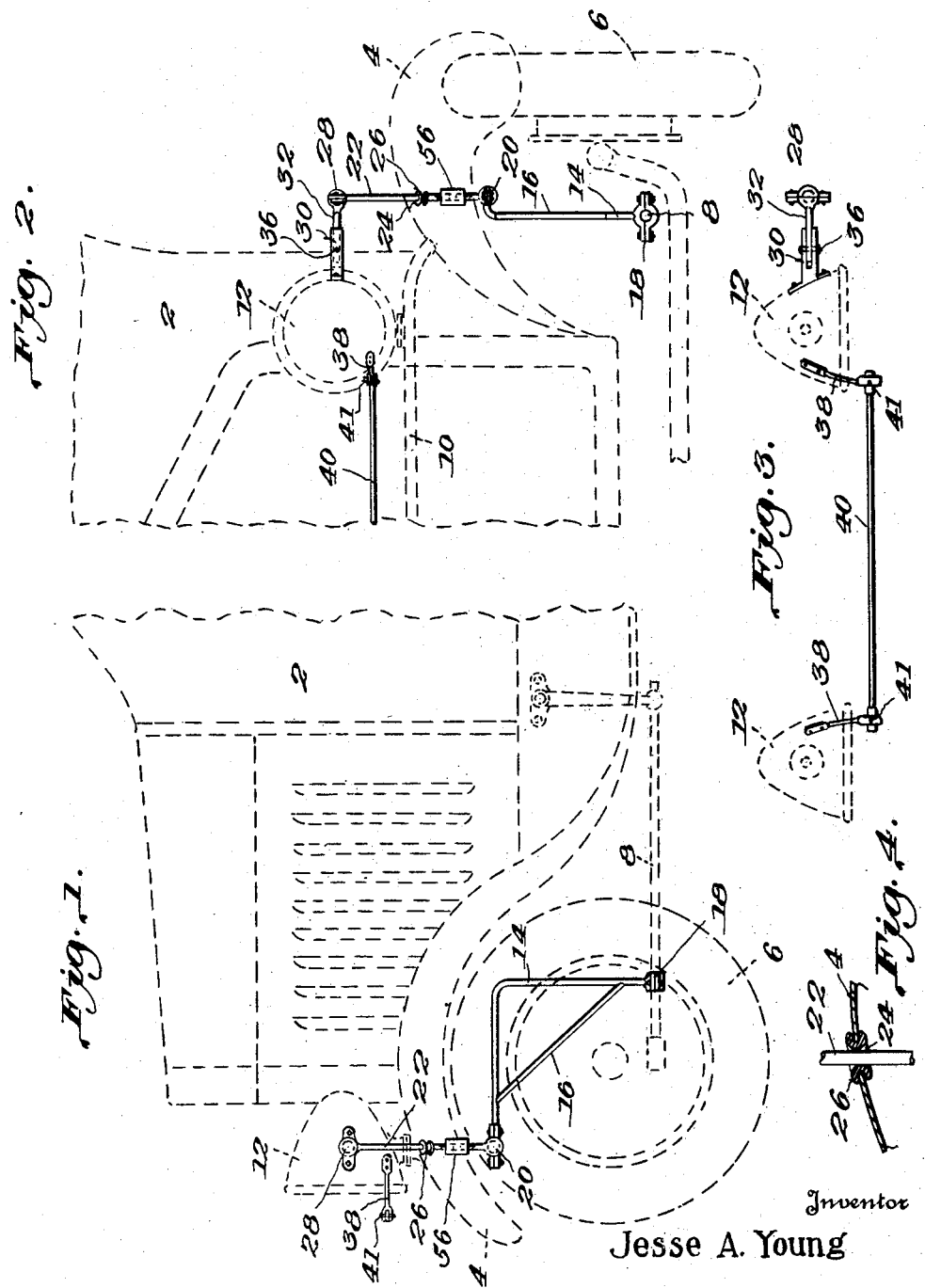
Inventor
Jesse A. Young
By
Attorney

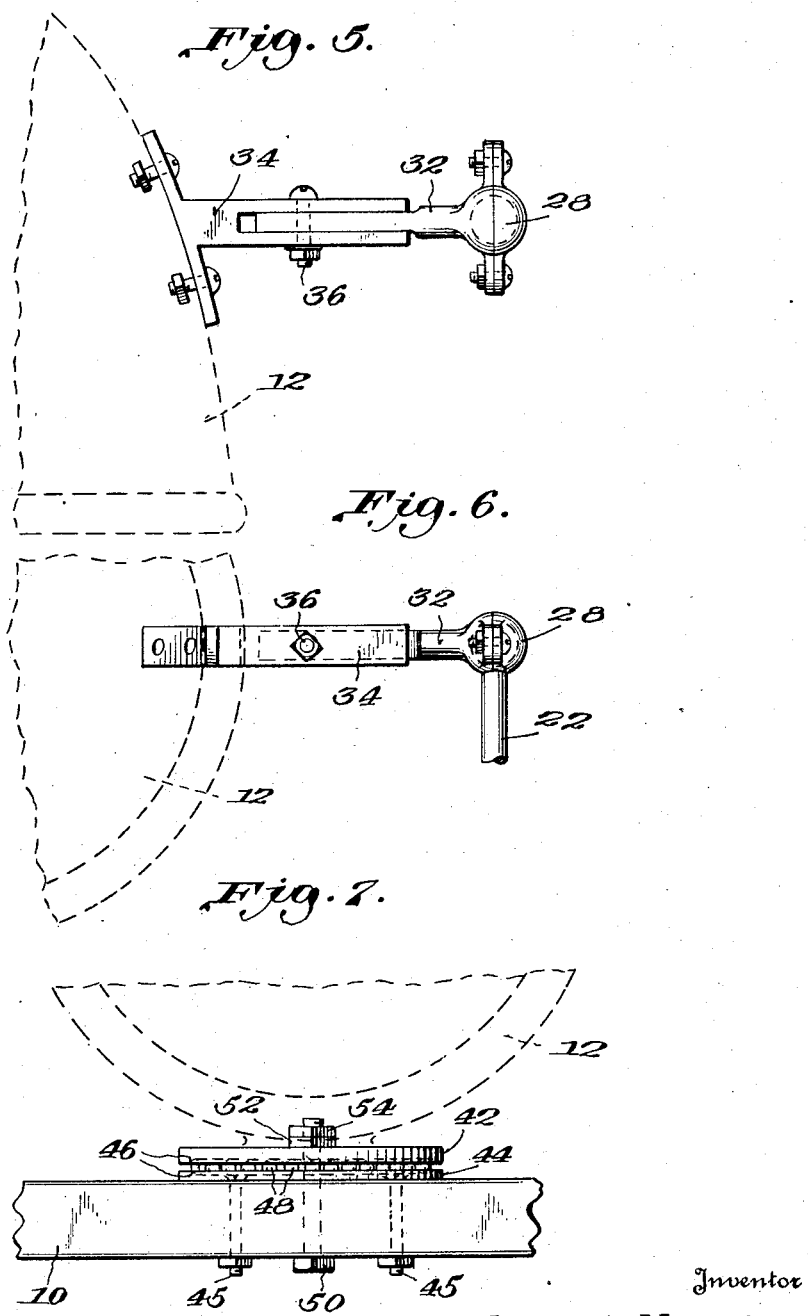

UNITED STATES PATENT OFFICE

JESSE A. YOUNG, OF CLARKSVILLE, TENNESSEE

CONTROL FOR DIRIGIBLE HEADLIGHTS

Application filed May 27, 1931. Serial No. 540,463.

My invention relates to controls for dirigible headlights for automobiles or other vehicles of the type which are controlled by the steering mechanism in such a manner that the lights are turned in the direction in which the automobile is turning.

The primary object of my invention is to provide a novel and improved mechanism of this type. Another object of the invention is to provide a system of levers which can be applied to the ordinary car with little difficulty and without changing the location of the lights. A further object of the invention is to provide a novel arrangement of levers and links connecting the steering mechanism with one of the lights, one of these links or levers extending through an opening in the fender and being fulcrumed in this opening. A further object is to provide means for connecting the two lights for joint movement, these means extending in front of the lights so that the location of the lights need not be changed and so that the lines of the car will not be destroyed. Finally, it is an object of my invention to provide a simple and effective mounting to permit the turning of the lights which can be substituted very easily for the ordinary fixed mounting.

Other objects and advantages of the invention will be apparent from the following description when taken in conjunction with the accompanying drawings which form a part thereof.

In the drawings:

Fig. 1 is a side elevation of my control means, the automobile being shown in broken lines.

Fig. 2 is a front elevation of the same.

Fig. 3 is a top plan view of the headlights and the connection therebetween.

Fig. 4 is a detail cross section of the fulcrum for the intermediate link.

Fig. 5 is a top plan view of a detail.

Fig. 6 is a rear elevation of the same.

Fig. 7 is a front elevation of the mounting of one of the lights.

The drawings show an automobile 2 having a fender 4, wheels 6 and a steering mechanism including a drag link 8 which connects the steering shaft to the front wheels. In addition, there is the usual cross-bar or rod 10 in the front of the automobile on which are mounted headlights 12 in a manner to be described below.

Rigidly attached to the drag link 8 is a rod 14 having a triangular bracing portion 16 integral therewith. A split clamp 18 the parts of which are secured together by bolts may be used for holding the end of the rod 14 rigidly in place. At the free end of the rod 14 a ball and socket joint 20 is provided, connecting this rod with an upright link or lever 22 for universal movement therebetween. The lever 22 extends through a hole 24 in the fender 4 and is fulcrumed therein. The hole 24 is provided with a washer 26 of fibrous or other non-metallic material to prevent the lever 22 from rattling in the hole. The upper end of the lever 22 is provided with a second ball and socket joint 28 to which is connected a substantially horizontal link member 30. This link member 30, as shown in Figs. 5 and 6, is composed of two parts 32 and 34, hinged together by a horizontal pivot 36. The member 34 is rigidly secured to one side of one of the lights 12.

The lights 12 must be joined together for common movement. Rigidly secured to the inner side surface of each of the headlights is an arm 38, extending forwardly of the lights. The two arms 38 are connected by a link 40 pivoted at 41, 41 to the outer or forward ends of the two arms.

Fig. 7 shows in detail the mounting for the lights. On the usual cross rod 10 is placed a pair of opposed discs 42, 44, these discs having oppositely directed circumferential grooves 46 in their mating faces, and ball bearings 48 in these grooves. The upper disc 42 is secured to the light, while disc 44 is secured to the rod 10 by bolts 45. A bolt 50 extends upwardly through the rod 10 and through the centers of the two plates, and the upper end of the bolt is engaged by nuts 52, 54 which engage the inner side of the lights and hold it in position on the rod 10. In this way, free rotation of the lights is permitted, without changing their position on the vehicle.

The link or lever 22 is preferably formed in two sections, connected by a turnbuckle 56. This permits insertion through the fender, and also allows some adjustment of the parts.

It will be obvious that when the drag link 8 is moved forward in turning to the left, the upper end of link 22, swinging around the hole 24, will move backwards and will turn the lights 12 to the left. At the same time, the right hand light will also be moved. The return movement of the drag link to straighten out the wheels will also straighten the lights. The pivotal link 30 serves to allow for movement between the steering drag link 8 and the lights 12 which is permitted by the springs of the car.

The fulcruming of the link 22 in the fender permits the whole mechanism to be applied to an ordinary car with the labor only of drilling a hole in the fender. No pivots of any kind need be mounted in the body of the car, and no special provisions are necessary. This also permits the proper location of the leverage system with respect to the lights so that no complicated arrangement of levers is necessary and so that the lights need not be moved, and the original lines of the car body can be preserved. In addition, the novel mounting for the headlights and the connection between the two lights may both be applied without changing the location of the lights with respect to the car and with very little labor. The whole construction is therefore simple, inexpensive and easily applied.

While I have described herein one embodiment of my invention, I wish it to be understood that I do not intend to limit myself thereby except within the scope of the appended claims.

I claim:

1. In a vehicle having a steering mechanism and a fender, a headlight mounted to turn about a vertical axis, a link connected to said light, a lever connected to said link and fulcrumed in said fender, and a second link connected to said lever and to the steering mechanism, whereby movement of the steering mechanism to turn the vehicle also turns said light.

2. In a vehicle having a steering mechanism including a drag link and a fender, a pair of headlights mounted to turn about vertical axes, a link secured to one of said lights, a second link pivoted to said first link and fulcrumed in said fender, a member fixed on said drag link and pivoted to said second link, and means connecting said lights to cause them to move together, whereby movement of the steering mechanism to turn the vehicle also turns the lights.

3. In a vehicle having a steering mechanism including a drag link and a fender, said fender having an aperture therein, an annular member of non-metallic material within said aperture and covering the edges thereof, a pair of headlights mounted to turn about vertical axes, a link secured to one of said lights, a second link pivoted to said first link and fulcrumed in said annular member, a member fixed on said drag link and pivoted to said second link, and means connecting said lights to cause them to move together, whereby movement of the steering mechanism to turn the vehicle also turns said lights.

4. In a vehicle having a steering mechanism and a fender, a pair of headlights mounted to turn about vertical axes, means connecting said lights to cause them to move together, a link connected to one of said lights including two parts hinged together on a horizontal pivot, a second link pivoted to said first link and fulcrumed in said fender, a third link pivoted to said second link and connected to said steering mechanism, whereby movement of the steering mechanism to turn the vehicle also turns said lights, said first link serving to permit relative vertical movement between said steering mechanism and said lights.

5. In a vehicle having a fender having an aperture therein, a steering mechanism including a drag link, a rod extending across the front thereof, and a pair of headlights, that improvement which comprises a disc mounted on said rod, other discs secured to said lights and overlying said first discs, the discs of each pair having aligned annular grooves in their mating faces, ball bearings in said grooves, means for holding said discs together, arms rigidly secured to the inner sides of said lights and extending forwardly thereof, a link pivotally connected to the forward ends of said arms, an annular member of non-metallic material within said aperture and covering the edges thereof, a link connected to one of said lights including two parts hinged together on a horizontal pivot, a second link pivoted to said first link and fulcrumed in said annular member, and a member pivoted to said second link and rigidly secured to said drag link, whereby movement of said steering mechanism to turn the vehicle also turns said lights.

6. In a vehicle having a steering mechanism and a fender, a headlight mounted to turn about a vertical axis, a lever fulcrumed in said fender, and means pivotally connecting said lever to said headlight and to said steering mechanism, whereby movement of the mechanism to turn the vehicle also turns said light.

7. In a vehicle having a steering mechanism and a fender, a headlight mounted to turn about a vertical axis, a lever extending through said fender and having a fulcrum supported by said fender, and means pivotally connecting said lever to said headlight and to said steering mechanism, whereby movement of the mechanism to turn the vehicle also turns said light.

In testimony whereof, I have hereunto set my signature.

JESSE A. YOUNG.